United States Patent Office 2,846,439
Patented Aug. 5, 1958

2,846,439
REACTION OF THREONINES WITH ARYL NITRILES IN A STERIC INVERSION PROCESS

Tokio Joyama, Toyonaka, Japan, assignor to Takeda Pharmaceutical Industries, Ltd., Osaka, Japan No Drawing. Application June 3, 1957
Serial No. 663,004

Claims priority, application Japan June 5, 1956

4 Claims. (Cl. 260—307)

This invention relates to a method for the steric inversion of allothreonine and to a process for the preparation of threonine and its intermediates by the use of the method.

It is a well known fact that threonine is one of the essential amino acids and plays an important role as a nutrient in daily life as well as in medical treatment. Threonine is extensively distributed in the animal and vegetable kingdoms. For example, it is contained in eggs, skim-milk, casein and gelatine in the content of about 5.3, 4.6, 4.0 and 1.4%, respectively. Threonine, having the structure of α-amino-β-hydroxybutyric acid, possesses two asymmetric carbon atoms, and hence it is natural that there exist four isomers of this compound. Threonine is divided into threo- and allo-series according to the configuration of the hydroxyl group at the β-position, and each of the series is subdivided into D- and L-series according to the configuration of the amino group at the α-position. Therefore, α-amino-β-hydroxybutric acid is divided in all into four series, that is, L-threo-, D-threo-, L-allo- and D-allo-series, and they are called L-threonine, D-threonine, L-allothreonine and D-allothreonine, respectively.

Natural threonine is L-threonine and has an important significance as a nutrient, while the other three isomers do not exist in the natural world and have no such a significance. As in the case of other amino acids, synthetic α-amino-β-hydroxybutric acid consists of the four isomers in many cases, and therefore if threonine is to be isolated, the product must be subjected to resolution and (or) inversion. Since synthetic α-amino-β-hydroxybutyric acid generally contains a large amount of DL-allo-isomers besides DL-threo-compounds, it seems more advantageous for the preparation of L-threonine to invert the allo-isomers into the threo-compounds than to resolve the material into allo- and threo-series. And the DL-threo-compounds thus obtained are subjected to the conventional optical resolution to separate L-threonine.

As a method for effecting the steric inversion there is known a process which comprises converting allo-α-amino-β-hydroxybutric acid (or a mixture containing a small amount of threo-α-amino-β-hydroxybutric acid) into an oxazoline carboxylic acid derivative and then hydrolyzing the product. Also there are known two methods for the preparation of the oxazoline-carboxylic acid derivative.

(1) α-Amino-β-hydroxybutric acid is first esterified with hydrogen chloride and alcohol, for example, and then reacted with an aryl-imidoether, and the product is hydrolyzed with alkali (D. F. Elliott: J. Chem. Soc., 1949, 589; ibid., 1950, 62).

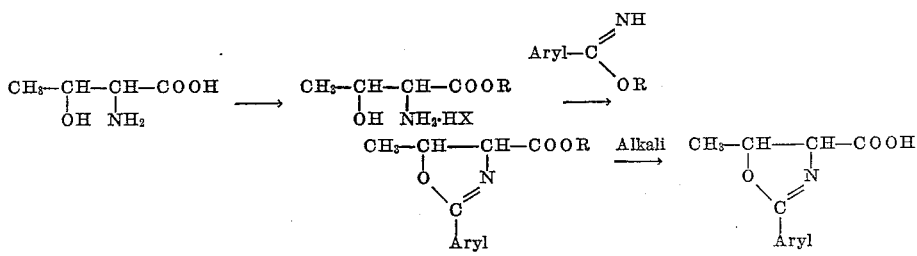

(2) α-Amino-β-hydroxybutyric acid is esterified and then reacted with an aroylhalide to produce the corresponding α-aroylamino-β-hydroxybutric acid ester. The product is treated with an acid reagent such as thionylchloride to form the oxazoline ring and finally hydrolyzed with alkali (K. Pfister, 3rd et al.: J. Am. Chem. Soc., 71, 1101 (1949)).

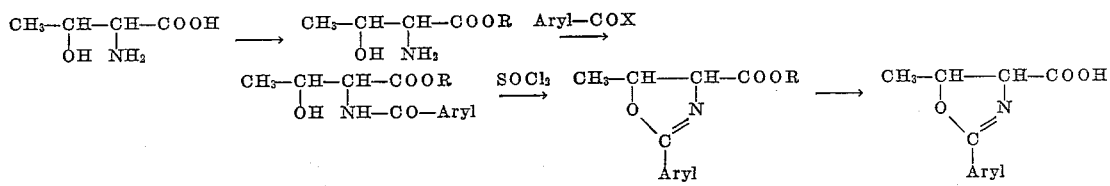

It was clarified by studies of the present inventor that reaction of α-amino-β-hydroxybutric acid with an aryl-nitrile in the presence of an alkaline condensing agent readily produces the corresponding 2-aryl-5-methyl-Δ²-oxazoline-4-carboxylic acid, that when the reaction mixture is left standing for a long time, it is sometimes partially hydrolyzed to form α-aroylamino-β-hydroxybutyric acid, and further that hydrolysis of these products affords only threo-α-amino-β-hydroxybutyric acid whatever steric configuration the material may have.

According to the present method the starting material can be used without being esterified, and therefore the process is much simplified. Moreover, the present method is different from the known methods in the following important point. In the known methods not only allo-compounds but also threo-compounds are inverted because an acid condensing agent is employed, and hence if the material contains a small quantity of threo-compounds, the product is contaminated with a small amount of allo-compounds. Consequently, in order to obtain pure threo-compounds the product must be further purified over sodium salt (K. Pfister, 3rd et al.: J. Am. Chem. Soc. 71, 1101 (1949)). Since in the present method only allo-compounds are inverted, the product is all threo-compounds even if the material contains threo-compounds.

In the present method, it is not necessary to conduct hydrolysis, and when the alkali is removed by an ion-exchanger, free 2-aryl-5-methyl-Δ²-oxazoline-4-carboxylic acid is obtained directly. As mentioned before, α-amino-β-hydroxybutyric acid is reacted with an arylnitrile in the presence of an alkaline condensing agent in the present method. As the alkaline condensing agent are conveniently used alkali metal alcoholate, etc., and as the arylnitrile, benzonitrile, toluylnitrile, etc. The reaction is generally carried out in a lower aliphatic alcohol, but it may be conducted in another suitable solvent. When a mixture of the materials is left standing at room temperature for several days, the reaction proceeds to form the corresponding oxazolinecarboxylic acid derivative, but when the reaction mixture is allowed to stand far longer, the oxazoline ring seems to be ruptured by the alkalinity of the reaction mixture to form α-aroyl-amino-β-hydroxybutyric acid. However, under some conditions substantial formation of the oxazolinecarboxylic acid derivative may not be observed. Thus, the reaction mechanism in the present method is not necessarily definite. That is, the product is the pure oxazoline-carboxylic acid derivative, or α-aroylamino-β-hydroxybutyric acid, or a mixture of both compounds depending upon the reaction conditions. But any of the products and the mixture can be converted to threonine by acid hydrolysis as will be mentioned later. Therefore, the kind of the intermediates and the course of the reactions have no important significance as to the objective of the present invention which aims at the steric inversion of threonine. In any case, heating may be applied to shorten the reaction time, but in general drastic reaction conditions are not necessary.

The oxazolinecarboxylic acid derivative or α-aroyl-amino-β-hydroxybutyric acid or their mixture thus produced is obtained as an alkaline aqueous solution when the solvent is distilled off, the residue is diluted with water and the unreacted nitrile is recovered. When the alkaline solution is treated with a suitable, slightly acid ion-exchanger such as ion-exchange resin, Amberlite-IRC-50, to remove the alkali, the oxazolinecarboxylic acid derivative or α-aroylamino-β-hydroxybutyric acid or their mixture (they are weakly amphoteric electrolytes) is obtained as an aqueous solution. Crystals of the oxazolinecarboxylic acid derivative (α-aryl-5-methyl-Δ²-oxazoline-4-carboxylic acid) can be readily obtained by concentration of its aqueous solution. If the solution contains α-aroylamino-β-hydroxybutyric acid, it can be separated by shaking the solution with ethyl acetate, butanol or the like. The oxazoline carboxylic acid derivative and α-aroylamino-β-hydroxybutyric acid thus obtained can be readily converted to threonine (threo-α-amino-β-hydroxybutyric acid) by acid hydrolysis. If necessary, the oxazolinecarboxylic acid derivative and α-aroylamino-β-hydroxybutyric acid are resolved into their optically active components by an optically active base or acid directly or after being hydrolyzed.

The course of the reactions in the present invention is shown by the following scheme.

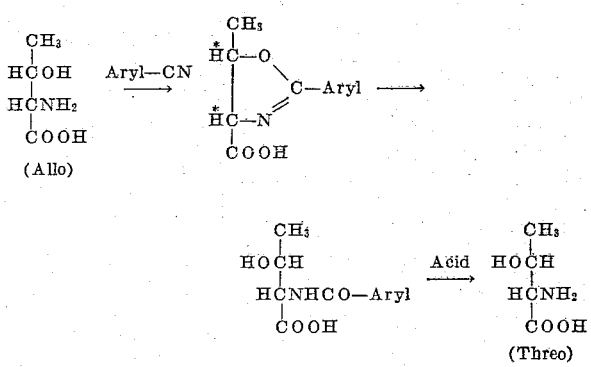

Example 1

To a solution of sodium methoxide prepared from 6.9 g. (0.3 mole) of metallic sodium and 150 cc. of methanol are added 35.7 g. (0.3 mole) of DL-allo-α-amino-β-hydroxybutyric acid (containing a small amount of the threo-series isomer) and 61.8 g. (0.6 mole) of benzonitrile, and the whole is left standing at room temperature for several days. The reaction mixture is diluted with water and the unreacted benzonitrile is removed by shaking with benzene. The aqueous solution is passed through a layer of Amberlite-IRC-50 to eliminate alkali and then concentrated, whereupon 25 g. of 2-phenyl-5-methyl-Δ²-oxazoline-4-carboxylic acid is obtained.

Example 2

To a solution of sodium ethoxide prepared from 6.9 g. of metallic sodium and 200 cc. of ethanol are added 35.7 g. of DL-allo-α-amino-β-hydroxybutyric acid and 70.2 g. of p-toluylnitrile. The mixture is treated in the same manner as in Example 1 to obtain 24.6 g. of 2-p-toluyl-5-methyl-Δ²-oxazoline-4-carboxylic acid.

Example 3

To a solution of sodium methoxide prepared from 6.9 g. of metallic sodium and 150 cc. of methanol are added 35.7 g. of DL allo-α-amino-β-hydroxybutyric acid and 61.8 g. of benzonitrile, and the mixture is allowed to stand at room temperature for 9 days. The solvent is distilled off and the residue is left standing for 7 more days. The reaction mixture is diluted with water and the unchanged benzonitrile is taken up in benzene. The aqueous solution is passed through a layer of Amberlite-IRC-50 (Type-H) to remove alkali and evaporated to dryness, and the residue is recrystallized from ethyl acetate to give 19.5 g. of DL-N-benzoylthreonine.

Example 4

To 10 g. of the 2-phenyl-5-methyl-Δ²-oxazoline-4-carboxylic acid obtained in Example 1 is added 100 cc. of 15% hydrochloric acid and the mixture is heated on the water bath for 10 hours. After cooling, the separated benzoic acid is filtered off and the filtrate is passed through a layer of Amberlite IR-4B to remove acid and then concentrated, whereupon 4.2 g. of DL-threonine is obtained.

Example 5

To 32.5 g. of the DL-N-benzoylthreonine obtained in Example 3 is added diluted sulfuric acid prepared from 5 g. of concentrated sulfuric acid and 100 cc. of water, and the mixture is heated on the water bath for 8 hours. After cooling, the separated benzoic acid is filtered off, and the filtrate is shaken with benzene to remove benzoic acid completely. The aqueous solution is neutralized with barium hydroxide solution to remove sulfuric acid ion, treated with decolorizing carbon and concentrated, whereupon 10 g. of DL-threonine is obtained in colorless pillars.

What is claimed is:

1. A method for the preparation of a member selected from the group consisting of 2-phenyl-5-methyl-Δ²-oxazoline-4-carboxylic acid, 2-p-toluyl-5-methyl-Δ²-oxazoline-4-carboxylic acid and a mixture of either of these with the corresponding α-aroylamino-β-hydroxybutyric acid, which comprises condensing a member selected from the group consisting of allothreonine and a mixture of allothreonine and threonine, with the corresponding member selected from the group consisting of benzonitrile and toluylnitrile in the presence in the reaction medium of an alkali metal lower aliphatic alcoholate.

2. A method for the preparation of 2-phenyl-5-methyl-Δ²-oxazoline-4-carboxylic acid, which comprises condensing allothreonine with benzonitrile in the presence in the reaction medium of sodium methoxide.

3. A method for the preparation of 2-p-toluyl-5-methyl-Δ²-oxazoline-4-carboxylic acid, which comprises condensing allothreonine with p-toluylnitrile in the presence in the reaction medium of sodium ethoxide.

4. A method for the preparation of 2-phenyl-5-methyl-Δ²-oxazoline-4-carboxylic acid which comprises condensing a mixture of allothreonine and the corresponding threonine with benzonitrile in the presence in the reaction medium of sodium methoxide.

References Cited in the file of this patent

UNITED STATES PATENTS 2,571,940    Pfister et al. _____ Oct. 16, 1951

UNITED STATES PATENT OFFICE
CERTIFICATE OF CORRECTION

August 5, 1958

Patent No. 2,846,439

Tokio Joyama

It is hereby certified that error appears in the printed specification of the above-numbered patent requiring correction and that the said Letters Patent should read as corrected below.

Column 2, lines 6, 7, 11, 31 and 49, for "hydroxybutric", each occurrence, read --hydroxybutyric--; column 2, line 11, for "(11" read --(1)--.

Signed and sealed this 14th day of October 1958.

(SEAL)
Attest:
KARL H. AXLINE
Attesting Officer

ROBERT C. WATSON
Commissioner of Patents